(12) United States Patent
Keyes et al.

(10) Patent No.: US 6,910,816 B2
(45) Date of Patent: Jun. 28, 2005

(54) DIGITAL FILM PROCESSING METHOD

(75) Inventors: Michael P. Keyes, Round Rock, TX (US); Douglas E. Corbin, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/914,426

(22) Filed: Aug. 9, 2004

(65) Prior Publication Data

US 2005/0008981 A1 Jan. 13, 2005

Related U.S. Application Data

(62) Division of application No. 10/657,634, filed on Sep. 8, 2003, now Pat. No. 6,824,966, which is a division of application No. 09/745,698, filed on Dec. 21, 2000, now Pat. No. 6,664,034.
(60) Provisional application No. 60/174,130, filed on Dec. 31, 1999.

(51) Int. Cl.$^7$ ................................................ G03D 5/06
(52) U.S. Cl. ...................... 396/609; 396/604; 396/624; 430/365; 430/423
(58) Field of Search ................................ 396/604, 609, 396/624; 430/365, 423

(56) References Cited

U.S. PATENT DOCUMENTS

| | | | | |
|---|---|---|---|---|
| 2,266,452 A | * | 12/1941 | Vittum et al. ................ | 430/376 |
| 2,373,821 A | | 4/1945 | Frohlich et al. ................. | 95/6 |
| 2,404,138 A | | 7/1946 | Mayer ............................ | 95/94 |
| 3,520,689 A | | 7/1970 | Nagae et al. ................... | 96/55 |
| 3,520,690 A | | 7/1970 | Nagae et al. ................... | 96/55 |
| 3,587,435 A | | 6/1971 | Chioffe ........................... | 95/89 |
| 3,615,479 A | | 10/1971 | Kohler et al. ................... | 96/48 |
| 3,615,498 A | | 10/1971 | Aral ................................ | 96/55 |
| 3,617,282 A | | 11/1971 | Bard ............................... | 96/59 |
| 3,747,120 A | | 7/1973 | Stemme ......................... | 346/75 |
| 3,903,541 A | | 9/1975 | Von Meister et al. ........ | 354/317 |
| 3,946,398 A | | 3/1976 | Kyser et al. .................... | 346/1 |
| 3,959,048 A | | 5/1976 | Stanfield et al. .............. | 156/94 |
| 4,026,756 A | | 5/1977 | Stanfield et al. ............. | 156/554 |
| 4,081,577 A | | 3/1978 | Horner ......................... | 427/424 |
| 4,142,107 A | | 2/1979 | Hatzakis et al. ............ | 250/571 |
| 4,215,927 A | | 8/1980 | Grant et al. ................. | 354/317 |
| 4,249,985 A | | 2/1981 | Stanfield ..................... | 156/554 |
| 4,301,469 A | | 11/1981 | Modeen et al. ............... | 358/75 |
| 4,490,729 A | | 12/1984 | Clark et al. .................... | 346/75 |
| 4,501,480 A | | 2/1985 | Matsui et al. ............... | 354/298 |
| 4,564,280 A | | 1/1986 | Fukuda ........................ | 354/317 |
| 4,594,598 A | | 6/1986 | Iwagami ...................... | 346/140 |
| 4,621,037 A | | 11/1986 | Kanda et al. ................. | 430/30 |
| 4,623,236 A | | 11/1986 | Stella .......................... | 354/318 |

(Continued)

FOREIGN PATENT DOCUMENTS

| | | | | |
|---|---|---|---|---|
| EP | 0 261 782 A2 | 8/1987 | ............ | H04N/1/46 |
| EP | 0 422 220 A1 | 3/1989 | ............ | A61B/6/03 |
| EP | 0 482 790 B1 | 9/1991 | ............ | H04N/1/40 |

(Continued)

OTHER PUBLICATIONS

"Adaptive Fourier Threshold Filtering: A Method to Reduce Noise and Incoherent Artifacts in High Resolution Cardiac Images". Doyle, M., et al., 8306 Magnetic Resonance in Medicine 31, No. 5. Baltimore, MD, May, pp. 546–550, 1994.

(Continued)

*Primary Examiner*—Hoa Van Le
(74) *Attorney, Agent, or Firm*—David A. Norais

(57) ABSTRACT

A method of developing a latent image on a photographic element (such as imagewise exposed photographic film) by absorbing a dye precursor into the film, applying a developer solution to the film to develop the latent image and form a dye in the film, scanning the film with light, and detecting at least one of light reflected away from and light transmitted through the film.

1 Claim, 2 Drawing Sheets

U.S. PATENT DOCUMENTS

| | | | |
|---|---|---|---|
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,945,934 A * | 8/1990 | Vaughan, IV | 134/64 R |
| 4,969,045 A | 11/1990 | Haruki et al. | 358/228 |
| 4,994,918 A | 2/1991 | Lingemann | 358/214 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,300,381 A * | 4/1994 | Buhr et al. | 430/30 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,362,616 A | 11/1994 | Edwards et al. | 430/356 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,596,415 A | 1/1997 | Cosgrove et al. | 358/296 |
| 5,627,016 A | 5/1997 | Manico | 430/434 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A * | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,758,223 A * | 5/1998 | Kobayashi et al. | 396/604 |
| 5,771,107 A | 6/1998 | Fujimoto et al. | 358/464 |
| 5,790,277 A | 8/1998 | Edgar | 358/487 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |

FOREIGN PATENT DOCUMENTS

| | | | |
|---|---|---|---|
| EP | 0 525 886 A3 | 7/1992 | G03D/5/00 |
| EP | 0 580 293 A1 | 6/1993 | H04N/1/04 |
| EP | 0 669 753 A2 | 2/1995 | H04N/1/407 |
| EP | 0 794 454 A2 | 2/1997 | G03B/27/73 |
| EP | 0 930 498 A2 | 12/1998 | G01N/21/88 |
| WO | WO 90/01240 | 2/1990 | H04N/1/40 |
| WO | WO 91/09493 | 6/1991 | H04N/5/217 |
| WO | WO 97/25652 | 7/1997 | G03D/5/00 |
| WO | WO 98/19216 | 5/1998 | G03C/5/29 |
| WO | WO 98/25399 | 6/1998 | H04N/1/38 |
| WO | WO 98/31142 | 7/1998 | H04N/5/253 |
| WO | WO 93/34157 | 8/1998 | |
| WO | WO 98/34397 | 8/1998 | |
| WO | WO 99/43148 | 8/1999 | H04N/1/00 |
| WO | WO 01/01197 | 1/2001 | G03D/5/00 |
| WO | WO 01/13174 A1 | 2/2001 | G03D/5/06 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink-Jet Printing Technology", Hayes, D. et al., Display Works '99, MicroFab Technologies, Inc., pp. 1–4, 1999.

"Ink–Jet Based Fluid Microdispensing in Biochemical Applications", Wallace. D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

DIGITAL FILM PROCESSING METHOD

This is a Divisional application of application U.S. Ser. No. 10/657,634 filed Sep. 8, 2003 now U.S. Pat. No. 6,824,966 which is a divisional of application U.S. Ser. No. 09/745,698 filed Dec. 21, 2000 now U.S. Pat. No. 6,664,034.

This application claims the benefit of U.S. Provisional Application No. 60/174,130, filed Dec. 31, 1999, the entire disclosure of which is incorporated herein by reference.

BACKGROUND OF THE INVENTION

1. Field of the Invention

The present invention relates to digital film processing methods. More particularly, the present invention provides a digital film processing method wherein a dye is formed in the photographic element during processing in order to provide an increased signal range.

2. Description of Related Art

In traditional film photography, the photographic film includes one or more layers of a photosensitive material (typically silver halide). When a picture is taken, the light from the scene interacts with the film's photosensitive material to produce a chemical change in the photosensitive material. This chemical change is in direct proportion to the intensity of the light. The greater the intensity of light from the scene, the greater the chemical change in the photosensitive material. As described in greater detail below, the photographic film is then chemically developed in order to produce an image based on the chemical change.

Conventional black and white photographic film generally has a single layer of silver halide emulsion coated on a transparent film support. Color photographic film generally includes multiple layers of silver halide in combination with dye forming coupling agents. Each silver halide layer in color photographic film is sensitive to a different portion of the visible spectrum. Typically, color film includes one or more silver halide layers sensitized to each of blue, green and red portions of the visible spectrum, and the coupler in each layer is capable of forming a dye of a color which is complimentary to the color of light to which the layer is sensitized. For example, a silver halide layer which is sensitized to blue light will include a coupler associated with the formation of a yellow dye.

In traditional chemical development processes, the exposed film is developed using a developing agent. The developing agent chemically reduces the exposed silver halide to elemental silver. The amount of elemental silver produced in any given area of the film corresponds to the intensity of light which exposed that area. Those areas of the silver halide where the light intensity was the greatest will have the greatest amount of elemental silver produced. In contrast, in those areas of the silver halide where the light intensity was low, a very small amount of elemental silver is produced. The pattern of elemental silver thus forms an image in the silver halide layers.

During the traditional chemical development process, the highlight areas of the image (e.g., areas of the film which were exposed to the greatest intensity of light) will develop before those areas of the film which were exposed to a lower intensity of light (such as areas of the film corresponding to shadows in the original scene). A longer development time allows shadows and other areas of the film which were exposed to a low intensity of light to be more fully developed, thereby providing more detail in these areas. However, a longer development time will also reduce details and other features in the highlight areas of the image. Thus, the development time in a traditional chemical development process is typically chosen as a compromise between highlight details, shadow details and other features of the image which are dependant upon the duration of development. After development, in the case of black and white photographic film, the image is fixed by dissolving the undeveloped silver halide. The developed negative can then be used to produce a corresponding positive image on photographic paper by methods well known to those skilled in the art.

In the case of conventional color photographic film development, elemental silver is formed in the silver halide layers as described above. After the developing agent has reduced the exposed silver halide to elemental silver, the oxidized developing agent reacts with the couplers in the film to produce dye clouds around the grains of elemental silver in each of the layers. The color of the dye clouds in each layer of the film is complementary to the color of light the layer has been sensitized to. For example, the red sensitive layer typically produces cyan dye clouds, the green layer produces magenta dye clouds, and the blue layer produces yellow dye clouds. At this point, each layer of the color film includes both a silver image and a dye cloud image. The elemental silver and undeveloped silver halide are then removed from the film by bleaching and fixing, leaving only a dye image in each layer of the film. Since the dye in each emulsion layer is formed in an imagewise manner, the developed film will generally have yellow, magenta and cyan colored negative images in the blue, green, and red-sensitive emulsion layers, respectively. The color negative can then be used to produce a corresponding positive image on photographic paper by methods known to those skilled in the art.

The negative, or the corresponding positive image, can also be digitized using a conventional electronic scanner to produce a digital representation of the image. Scanning of negative images on film is typically accomplished by passing visible light through the developed negative. Light transmitted through the film is attenuated by developed silver (black and white film) or by the dye layers (color film), thereby allowing one to capture and record a digital representation of the image. The transmitted light is then passed through filters having appropriate spectral sensitivities such that the densities of the yellow, magenta and cyan dyes may be detected for each location on the film. The density values detected in this way are indirect measures of the blue, green and red light that initially exposed each location on the film. These measured density values constitute three values used as the blue, green and red values for each corresponding location, or pixel, in the digital image. Further processing of these pixel values is often performed to produce a digital image that accurately reproduces the original scene and is pleasing to the human eye.

A relatively new process for developing film is digital film processing ("DFP"). Digital film processing digitizes, i.e., electronically scans, the silver image during the development process. The elemental silver image developed in each of the layers of the photographic film is used to construct a digital image of the scene photographed. The developing film is scanned with infrared ("IR") light so that the scanning light will not fog the film. The image can be scanned at different times during the development process in order to acquire additional information from the photographic film. The digitized images are then electronically processed to determine the colors associated with each location. The resulting digital image can then be printed or manipulated, as desired.

As discussed previously, conventional color negative film includes dye precursors (specifically, couplers) in the light sensitive silver halide emulsion layers, and these couplers react with oxidized developing agent to form dyes in an imagewise manner. However, at least three different couplers must be used in at least three different emulsion layers of the film in order to allow for the formation of differently hued images which correspond to the different spectral sensitivities of each emulsion layer. For example, the emulsion layer(s) sensitized to blue light include a coupler which forms a yellow dye during development, while the emulsion layer(s) sensitized to green light include a coupler which forms a magenta dye. The dyes formed upon development of conventional color negative film do not attenuate IR light. Therefore, when conventional color negative film is subjected to DFP using IR light, the dyes formed during development will not attenuate the IR light used during scanning. Only the developed silver in the emulsion layers will attenuate the IR scanning light.

SUMMARY OF THE INVENTION

The present invention provides a method of developing a latent image on a photographic element (such as imagewise exposed photographic film), comprising: applying a dye precursor to the exposed photographic element; applying a developer solution to the photographic element, thereby developing the latent image and forming a dye in the photographic element; and scanning the photographic element with light while the latent image is developing. The light used for scanning is attenuated by both the developed silver as well as the dye formed in the film by the dye precursor.

The dye precursor may comprise a coupler, particularly a coupler which reacts with oxidized developing agent to imagewise form a dye in the silver halide emulsion layers of the film. The coupler may be provided in a solution which is applied to the film such that the coupler is absorbed into the film. Alternatively, the coupler may be provided in the developer solution itself, and is therefore absorbed into the film when the developer solution is applied to the film. Suitable couplers include those which are soluble in aqueous solutions, and which form dyes which are substantially insoluble in aqueous solution. The coupler forms a dye which absorbs the wavelength of the light used for scanning (such as IR light).

The methods of the present invention may be used with a variety of films, including black and white film (conventional as well as chromogenic), color negative film, color positive film and color reversal film. Since the couplers provided in the silver halide emulsion layers of conventional color film are not utilized in the methods of the present invention, they may be omitted from the film. Thus, film having at least one silver halide emulsion layer which is spectrally sensitized to each of blue, green and red light, but having no dye precursors incorporated therein, may be used in the methods of the present invention.

The scanning step is commenced a predetermined time after the developer solution has been applied to the film, and may be performed at multiple predetermined times after the developer solution has been applied to the film. For example, the film may be scanned at a short development time, at a normal development time and at a long development time, thereby allowing one to capture image detail in the highlight regions as well as the dark areas (e.g., shadows) of the image. Scanning merely comprises directing illumination light towards a first surface of the film, and detecting light which is either reflected away from the first surface (reflectance scan) or which is transmitted through the film (transmission scan). Particularly in the case of color film, two reflectance scans and one transmission scan may be performed at each of the predetermined times after film development has commenced. Detection of the scanning light may be accomplished, for example, by means of photodetector which produces an electrical signal proportional to the intensity of electromagnetic energy striking the photodetector.

The present invention also provides a digital film processing system for use in electronic film development. This system comprises a dye precursor supply station configured for applying a dye precursor solution to a film; a developer supply station configured for applying a developer solution to the film; and at least one scanning station for scanning the film with light after application of the dye precursor solution and the developer solution. The dye precursor and developer supply stations can comprise a variety of configurations. For example, each may include a slot coater configured to urge the solution through an elongate slot onto the film.

An aqueous dye precursor solution is also provided by the present invention, and consists essentially of a coupler capable of forming an infrared-absorbing dye. The dye precursor solution does not include a developing agent. However, it may include one or more compatible solvents, as well as other additives.

After the digital film processing method of the present invention has been performed on imagewise exposed film, a developed photographic film is provided. The developed film comprises a plurality of emulsion layers, wherein each of the layers has a silver and dye image. The same dye, however, is present in each of the layers, and the dye may be an infrared absorbing dye. By way of example, three layers may be provided in the film, with one layer sensitized to each of red, blue and green light. After the DFP process, each of these layers will be developed to produce a silver and dye image, with the same dye forming in each layer.

DETAILED DESCRIPTION OF THE PREFERRED EMBODIMENTS

As described in greater detail below, the present invention provides an improved digital film processing ("DFP") method wherein a dye is formed in the photographic element (e.g., photographic film) during DFP. A dye is formed in each of the light sensitive layers of the film in an imagewise fashion, and the dye is chosen so that it will attenuate electromagnetic radiation of the wavelength used during the scanning process, thereby providing an increased signal range without a corresponding increase in noise.

In order to form a dye in the emulsion layers of the film, a dye precursor (such as a coupler) is applied to the film. The dye precursor may even be provided in the developer solution itself. Thereafter, upon development of the exposed silver halide, the oxidized developing agent will react with the dye precursor to imagewise form dye clouds in each of the light sensitive layers of the film. Thus, the dye precursor need not be incorporated into the individual emulsion layers of the film. Rather, the dye precursor may be added to the film after it has been exposed.

Figure 1:
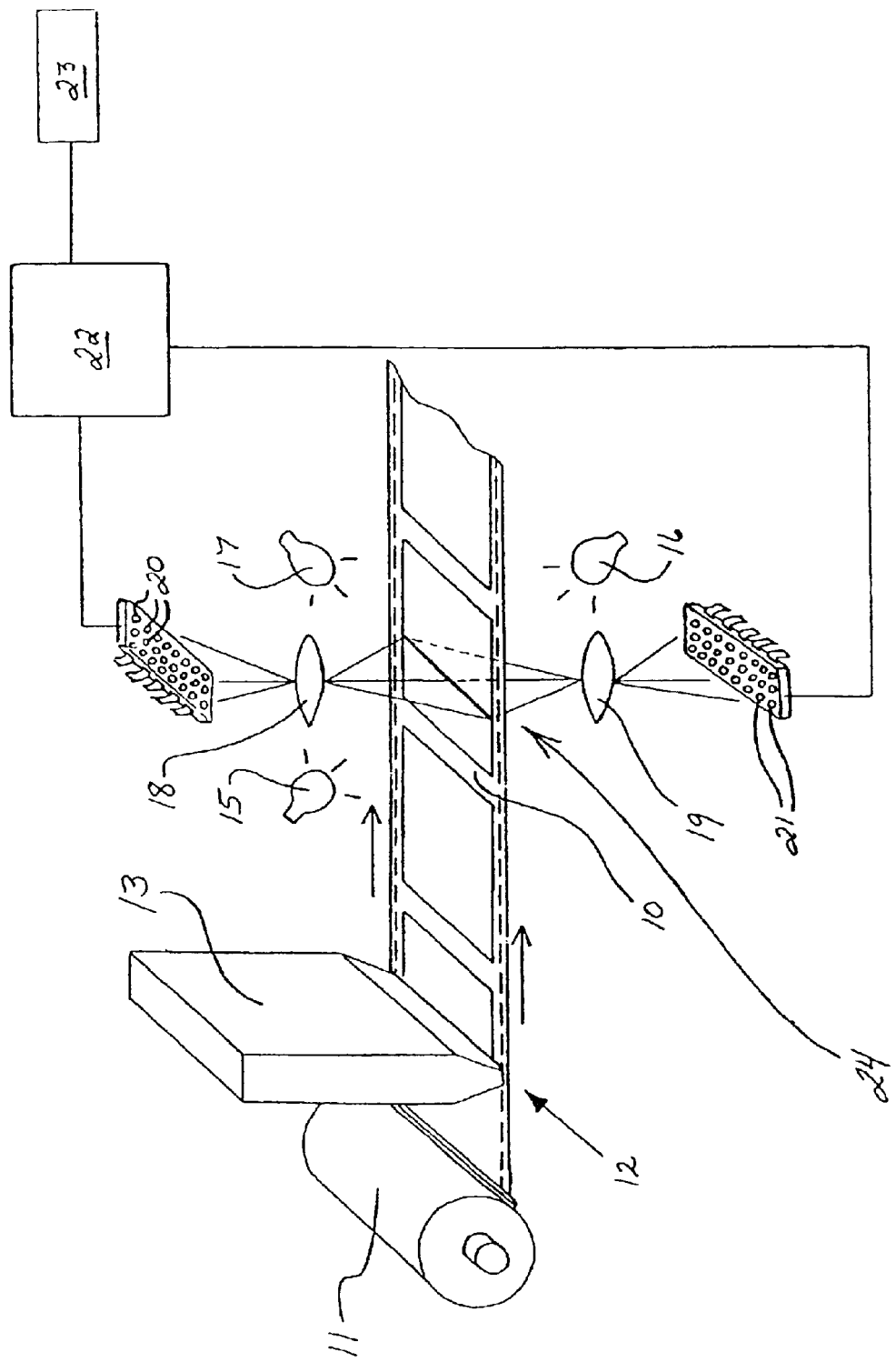
FIG. 1 is a schematic illustration of a digital film processing apparatus in accordance with one embodiment of the present invention.

FIG. 1 is a schematic representation of a DFP apparatus which may be employed to process an exposed photographic element, such as film 10 in cartridge 11. Film 10 can comprise any of a variety of photographic films having one or more light sensitive silver halide emulsion layers. For example, film 10 can comprise black and white film having one or more light sensitive silver halide emulsion layers (including chromogenic black and white film). Alternatively, film 10 can comprise conventional color negative film, or even color positive or reversal film. Conventional color negative film generally has at least three silver halide emulsion layers, with at least one layer sensitized to each of blue, green and red light. Although couplers are typically included in each of the light sensitive emulsion layers of conventional color negative film, the methods of the present invention allow for the elimination of these couplers in the film. Therefore, film 10 may even comprise a film having silver halide emulsion layers which are sensitized to each of blue, green and red light, with no couplers or other dye precursors incorporated therein.

After imagewise exposure, film 10 is subjected to digital film processing in accordance with the methods of the present invention. Film 10 is advanced from cartridge 11 through a developer supply station 12, whereat a developer solution is applied to film 10. Developer solution may be applied at station 12 by any of variety of means. For example, developer solution may be applied from a pod as a viscous fluid under a clear cover film, as described in U.S. Pat. No. 5,465,155 ("the '155 patent", which is incorporated herein by way of reference). Alternatively, the developer solution may be applied using the apparatus and methods described in U.S. Pat. No. 5,988,896. In the embodiment shown in FIG. 1, the developer solution is applied as a viscous fluid from slot coater 13 having an elongate slot positioned above, and extending across the width of, film 10. The developer solution is forced through the elongate slot of slot coater 13 onto film 10.

Figure 2:
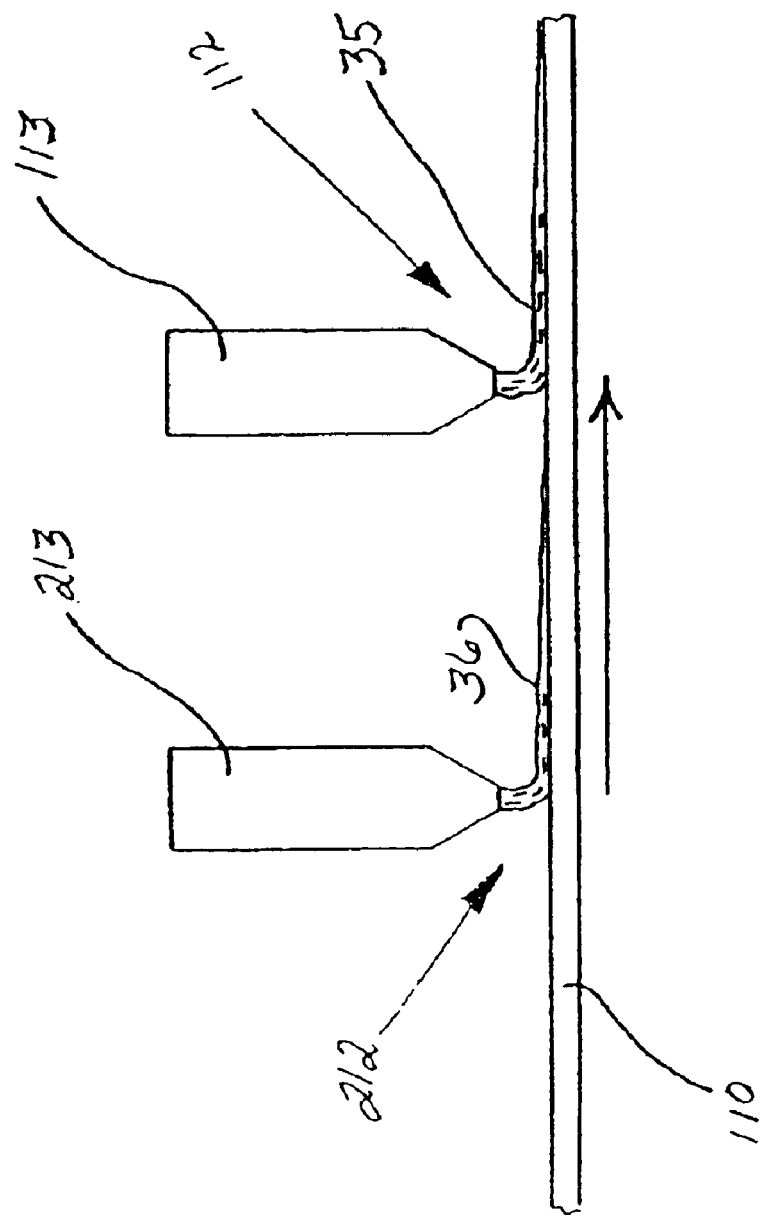
FIG. 2 is a schematic illustration of an alternative embodiment of a digital film processing apparatus (wherein the scanning station is not shown).

A dye precursor may be incorporated into the developer solution itself. In an alternative embodiment, a dye precursor solution (further described below) may be applied to the film prior to application of the developer solution. As shown in FIG. 2, a dye precursor supply station 212 may be provided immediately prior to a developer supply station 112. A dye precursor solution 36 may be applied to film 110 from slot coater 213 at dye precursor supply station 212 in the manner described previously. Thereafter, a developer solution 35 may be applied to film 110 from slot coater 113 at developer supply station 112. In this manner, as film 110 advances in the direction of the arrow shown in FIG. 2, film 110 will absorb the dye precursor solution 36 prior to application of the developer solution 35. No further process solutions (such as a stop bath, fixer or bleach) are needed beyond application of a dye precursor and a developer solution in order to accomplish DFP according to the present invention.

At a predetermined time after application of the developer solution, film 10 is scanned using electromagnetic radiation, such as light with one predominant frequency, preferably in the infrared region in order to avoid fogging the developing film. While the methods of the present invention may be used with a single reflectance or through scan for black and white film, two reflectance scans and at least one through scan may be performed (particularly for color film). Thus, a predetermined time after application of the developer solution, film 10 is subjected to a reflectance scan from each side ("front" and "back" scans) and at least one transmission scan ("through" scan). At least two electromagnetic radiation sources are generally used, with one positioned in front and one in back of the film. The radiation from these sources is attenuated by the elemental silver and dye at each spot on the film. The attenuated radiation is detected and converted to digital signals using appropriate optical and electronic systems. Based on the amount of detected radiation, one embodiment of the present invention produces three values, referred to as front, back, and through data, for each pixel on the film. These values are directly related to the elemental silver that forms the image in each layer of the film.

The above-described scans may be repeated at one or more additional predetermined times after application of the developer solution. For example, image data may be acquired at short, normal and long development times. Scanning may be performed at any number of predetermined times after application of the developer solution. In contrast, conventional film development allows only a single development time, and therefore compromises must be made between, for example, shadow and highlight detail.

As seen in FIG. 1, as film 10 progresses in the direction shown, it reaches a first scanning station 24. At scanning station 24, a first illumination light source 15 (such as a source of infrared light) directs light at the upper surface of film 10. Because of the opalescence caused by the absorption of the developer solution, light from illumination light source 15 will be reflected from film 10. The reflected light may be directed through one or more lenses 18, and thereafter detected by sensors 20 which measure the intensity of the light reflected from the film. Each sensor 20 comprises a photodetector which produces an electrical signal proportional to the intensity of electromagnetic energy striking the photodetector. The reflected light detected by sensors 20 may be converted into a digital signal which is transmitted to a computer 22. Sensors 20 are generally geometrically positioned in arrays such that the electromagnetic energy striking each sensor 20 corresponds to a distinct location of the image being scanned. This reflectance scan (also referred to as the "front" scan) may be performed line-by-line, pixel-by-pixel or as an area scan.

Light reflected from the front side of the film will be attenuated primarily by the elemental silver and dye in the uppermost emulsion layer. In the case of color negative film, for example, if the uppermost layer against which the light is directed comprises a blue sensitized silver halide emulsion layer, the reflected light which is detected by sensors 20 will primarily provide data concerning only the blue portion of the image. Therefore, "back" and "through" scans are used to collect data concerning the red and green portions of the image. It should be noted that computer 22 need not be separate from the other apparatus used in the methods of the present invention, since a processor may be incorporated into a single apparatus which also includes the scanning stations 24, and the developer supply station 12.

Also at first scanning station 24, a second illumination light source 16 (such as a source of infrared light) may be positioned such that light therefrom is directed at the lower surface of film 10, and light reflected therefrom passes through one or more lenses 19 and is thereafter detected by sensors 21 (the "back" scan). Once again the reflected light detected by sensors 21 may be converted into a digital signal which is transmitted to computer 22. Light reflected from the rear side of the film will be attenuated primarily by the elemental silver and dye in the lowermost emulsion layer. In the case of color negative film, for example, if the lowermost layer against which the light is directed comprises a red sensitized silver halide emulsion layer, the reflected light which is detected by sensors 21 will primarily provide data concerning only the red portion of the image.

Finally, a third illumination light source 17 (such as another source of IR light) may be positioned such that light therefrom is directed through film 10 ("through" scan), and passes through one or more lenses 19. The light thus transmitted through film 10 is thereafter detected by sensors 21, and may be converted into a digital signal which is transmitted to computer 22. Light transmitted through the film will be attenuated by the elemental silver and dye in all of the emulsion layers of the film. For conventional color negative film, the transmitted light detected by sensors 21 will provide data concerning the blue, green and red portions of the image. It should be noted that third illumination light source 17 may be omitted, since the through scan can be performed by light from source 15 or 16 being projected through the film and detected by sensors 21 or 20, respectively. In addition, through scans may also be performed through both sides of the film (i.e., "front-through" and "back-through" scans).

After scanning, the three digital signals representing the two reflectance and one transmission scan may be subjected to several image processing steps in order to compute the red, green and blue values for each individual pixel of the image. These steps are necessary because the elemental silver and dye of each layer of the film that form during development are not spectrally unique in each of the layers. These image processing steps are not performed when conventional scanners are used because the dyes which are formed with conventional color processing of the film make each film layer spectrally unique. However, just as with conventional scanners, once initial red, green and blue values are derived for each image, further processing of the red, green and blue values is usually done to produce images that more accurately reproduce the original scene and that are pleasing to the human eye.

As described in the '155 patent, multiple scanning stations may be employed for DFP such that the developing film is scanned at multiple predetermined times after application of the developer solution. For example, two reflectance scans and one transmission scan may be performed at first scanning station 24 a predetermined time after film development has commenced, as described above. Thereafter, film 10 may be subjected to two reflectance scans and one transmission scan at a second scanning station a second predetermined time after film development has commenced, and subsequently subjected to two reflectance scans and one transmission scan at a third scanning station a third predetermined time after film development has commenced. In this manner, digital representations of the image at short, normal and long development times may be computed. Of course the film may be scanned any number of predetermined times after application of the developer solution, and the present invention is not limited to methods employing only three scanning stations. The digital representations of the image may then be combined with one another (i.e., stitched together) to form a composite digital representation of the image. This digital representation may be viewed on a video monitor associated with computer 22, or printed on printer 23 connected to computer 22 (such as a laser printer or an ink jet printer).

Since the developed silver in each emulsion layer is not bleached out, the silver will attenuate the illumination light in the same manner as in, for example, the '155 patent. The present invention, however, employs a dye precursor which forms a dye in the emulsion layers of the film which also attenuates the electromagnetic radiation used during scanning (e.g., forms a dye which attenuates IR light). Since the combination of elemental silver and the dye will attenuate more light than the silver alone, the present invention provides an increased signal range between the low and high light exposure regions of the image. For example, little (if any) dye or silver will form in the unexposed regions of a negative film, while the more highly exposed areas of the film (e.g., the highlight regions of the negative) will have the most dye and silver formation. The attenuation of the illumination light will not be affected in the unexposed areas of the image where no dye has formed, while significantly greater attenuation will occur in the highlight areas. At the same time, the noise level (due to, for example, film graininess and noise caused by the electronics of the DFP system itself) will remain substantially the same.

The dye precursors which may be used in the present invention comprise couplers which are capable of forming dyes which absorb light of the wavelength used for scanning. Thus, when IR light is used for scanning, the dye formed during processing should be of a type which absorbs light in the IR spectrum. The couplers used in conventional color negative film do not form dyes which absorb IR light. In one embodiment, the dye precursor is provided in the developer solution itself, along with a suitable developing agent, such that the dye precursor is absorbed into the film. Alternatively, the dye precursor can be applied to the film prior to application of the developer solution, such that the dye precursor is absorbed by the film prior to application of the developer solution. When the single solution approach is used (i.e., dye precursor in developer solution), the dye precursor should be soluble in the developer solution (typically an aqueous solution). Thus, the dye precursor may be soluble in aqueous systems (which may optionally include one or more compatible solvents to facilitate solubilizing the dye precursor).

The dye itself is generally insoluble in the developer solution so that it will remain in the emulsion layers of the film during scanning. Thus, when an aqueous developer solution is employed, the dye which is formed should be insoluble in aqueous systems, regardless of whether the dye precursor is provided in the developer solution itself or in a separate solution which is applied prior to application of the developer solution.

The dye precursor also is chosen such that it will form a dye in the emulsion layers of the film in an imagewise fashion. The dye precursor may comprise a coupler of a type which will react with oxidized developing agent to form the desired dye in the emulsion layers of the film. In this manner, after the developing agent has reduced developable silver halide to elemental silver, the oxidized developing agent will then react with the coupler to form the dye in an imagewise fashion (i.e., the amount of dye formed at any particular location in the film will correspond to the silver density at the same location).

Suitable developing agents which, when oxidized, will react with a coupler to form a dye include aromatic primary amines. Exemplary developing agents which may be used in the present invention include various phenylenediamines (including salts thereof) well-known to those skilled in the art. Exemplary developing agents include:

4-Amino-3-methyl-N-ethyl-N-(β-hydroxyethyl)-aniline sulfate;

2-Amino-5-diethylaminotoluene Monohydrochloride; and

4-Amino-3-methyl-N-ethyl-N-(β-methanesulfonamidoethyl)-m-toluidine sesquisulfate monohydrate.

The first developing agent listed above is commonly used in the C-41 process for developing conventional color negative film. In fact, a C-41 developer solution may be used in the present invention. The developer solution may be aqueous, and may be maintained at an alkaline pH. In addition to the developing agent, the developer solution can include various other additives well-known to those skilled in the art. Suitable additives include, for example, various preservatives (e.g., sodium sulfite, sodium bisulfite, sodium metabisulfate or potassium metabisulfate), accelerators (e.g., potassium or sodium carbonate, potassium or sodium hydroxide, borax, or sodium metaborate), restrainers (such as potassium bromide), and antifoggants (such as benzotriazole or 6-nitrobenzimidazole nitrate).

The developer solution may also include the dye precursor, such as a coupler. Suitable couplers include those capable of forming dyes which are absorb (attenuate) by the light used for scanning (such as IR light) and which may be absorbed by the film. Suitable couplers include:

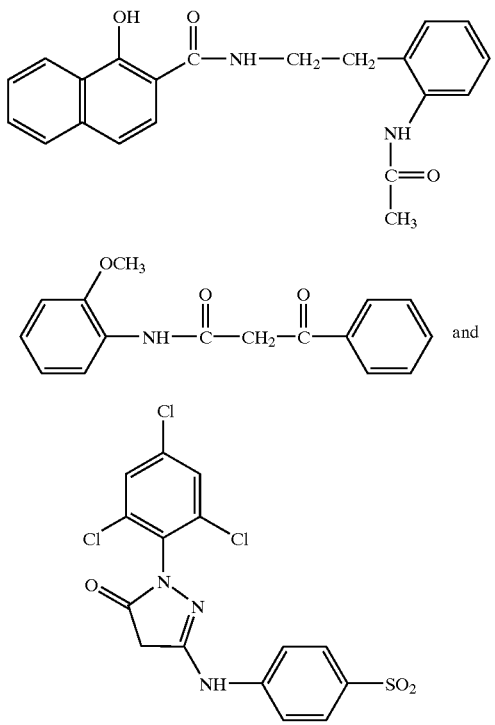

The above couplers form dyes upon reaction with oxidized developing agent. The coupler concentration is generally not critical, and the developer solution may include, for example, between about 1 and about 50 g/ml of the coupler. A suitable solvent, such as hexylene glycol, may be added to the developer solution in order to improve the solubility of the coupler. When the coupler is applied to the film from a separate solution, an aqueous solution of the coupler may be prepared in the same manner (and may include a suitable solvent in order to improve the solubility of the coupler).

The example provided below demonstrates the increased DFP signal range provided by the methods of the present invention.

EXAMPLE

Two identical C-41 developer solutions (available from Eastman Kodak) were prepared (250 ml each) in accordance with the manufacturer's instructions. These solutions were then modified as follows:

|  | Control | Developer Solution of Present Invention |
|---|---|---|
| C-41 Developer | 250 ml | 250 ml |
| Water | 20 ml | — |
| Hexylene glycol | 6 ml | — |
| Coupler solution | — | 26 ml |
| pH adjusted to | 11.65 | 11.65 |

The "Coupler solution" noted in the above table was prepared by adding 6.26 g of Coupler A (as identified previously) to 95 ml of water at about 45° C. with stirring. Next, 6.2 ml of hexylene glycol and 5.3 ml of 8M NaOH were added, and the solution was stirred for an additional 2–3 minutes.

Red, green, blue and gray step wedge exposures were made on two rolls of Kodak Gold 100 color negative film (available from Eastman Kodak) using an Opal film recorder (available from Management Graphics, Inc.). The exposed film was then developed in the above-described developer solutions for 2 minutes, at 38° C. (the recommended development time and temperature for the C-41 process). Immediately thereafter, the developed film was subjected to one transmittance and two reflectance scans (from opposite surfaces of the film) using light having a wavelength of 880 nm. LED's were used as the illumination light source, and the transmitted and reflected light was detected and quantified using a CCD sensor. The signal range for each of the exposures was measured by subtracting the signal obtained for the lowest light exposure pixels from the signal obtained for the highest light exposure pixels. The following results were obtained, wherein the signal range is reported in number of counts (0 to 255 possible counts):

|  | Control | Developer Solution of Present Invention |
|---|---|---|
| Front Reflectance Scan |  |  |
| Red | 11 | 24 |
| Green | 41 | 62 |
| Blue | 70 | 78 |
| Gray | 61 | 69 |
| Transmission Scan |  |  |
| Red | 83 | 89 |
| Green | 90 | 105 |
| Blue | 90 | 99 |
| Gray | 95 | 86 |
| Rear Reflectance Scan |  |  |
| Red | 57 | 68 |
| Green | 37 | 50 |
| Blue | 26 | 29 |
| Gray | 57 | 55 |

As noted in the above table, the method of the present invention provides a significantly improved signal range since the IR light used for scanning was attenuated by both the developed silver as well as the dye formed from the coupler provided in the developer solution.

What is claimed is:

1. A digital film processing system for use in electronic film development, comprising:

(a) a dye precursor supply station configured for applying a dye precursor solution to a film;

(b) a developer supply station configured for applying a developer solution to the film; and (c) at least one scanning station for scanning the film with light after application of the dye precursor solution and the developer solution.

* * * * *